United States Patent [19]

Mejia

[11] Patent Number: 4,587,923
[45] Date of Patent: May 13, 1986

[54] BATTERY CAP INDICATOR

[76] Inventor: Santiago Mejia, 525 N. Ocean Blvd. Apt. 1024, Pompano Beach, Fla. 33062

[21] Appl. No.: 522,529

[22] Filed: Aug. 12, 1983

[51] Int. Cl.$^4$ .............. G01F 23/30; G01N 9/12; H01M 10/48

[52] U.S. Cl. ................... 116/228; 73/307; 73/447; 73/322.5; 324/432; 429/91

[58] Field of Search ............. 73/291, 306, 307, 322, 73/444, 447, 305, 311, 322.5, 440, 448, 451; 116/228, 227; 324/432; 429/91

[56] References Cited

U.S. PATENT DOCUMENTS

| | | | |
|---|---|---|---|
| 1,482,852 | 2/1924 | Kloepper | 73/291 |
| 1,526,850 | 2/1925 | Davis et al. | 73/447 |
| 2,400,228 | 5/1946 | Franz et al. | 73/306 |
| 2,469,560 | 5/1949 | Jutte | 73/291 |
| 2,616,941 | 11/1952 | Lasko | 116/228 |
| 2,631,183 | 3/1953 | Babis | 73/444 |
| 2,840,034 | 6/1958 | Danias | 73/307 |
| 3,079,887 | 3/1963 | Dawkins | 429/91 |
| 3,080,753 | 3/1963 | Tickner et al. | 73/306 |
| 3,218,857 | 11/1965 | Van Woert | 73/306 |
| 3,915,753 | 10/1975 | Melone | 73/327 |

*Primary Examiner*—Charles Frankfort
*Assistant Examiner*—W. Morris Worth
*Attorney, Agent, or Firm*—Shlesinger, Arkwright, Garvey Fado

[57] ABSTRACT

A battery cap indicator has a transparent cap which permits the viewer to read both electrolyte level and density simultaneously, the indicators also giving the viewer the ability to determine whether the readings are at the higher or lower end of an acceptable range. The float assemblies of the indicator are configured for minimum friction with the guiding structure of the indicator body.

4 Claims, 11 Drawing Figures

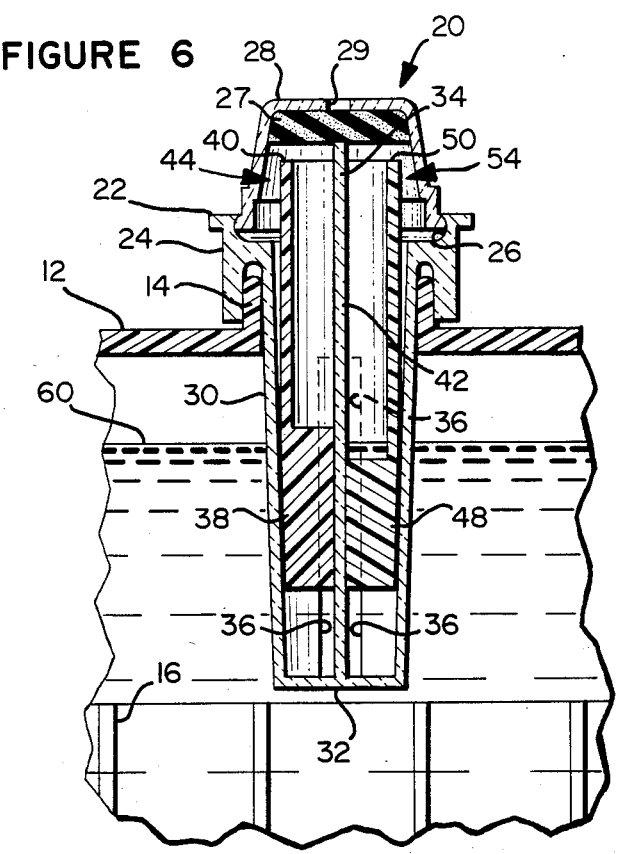
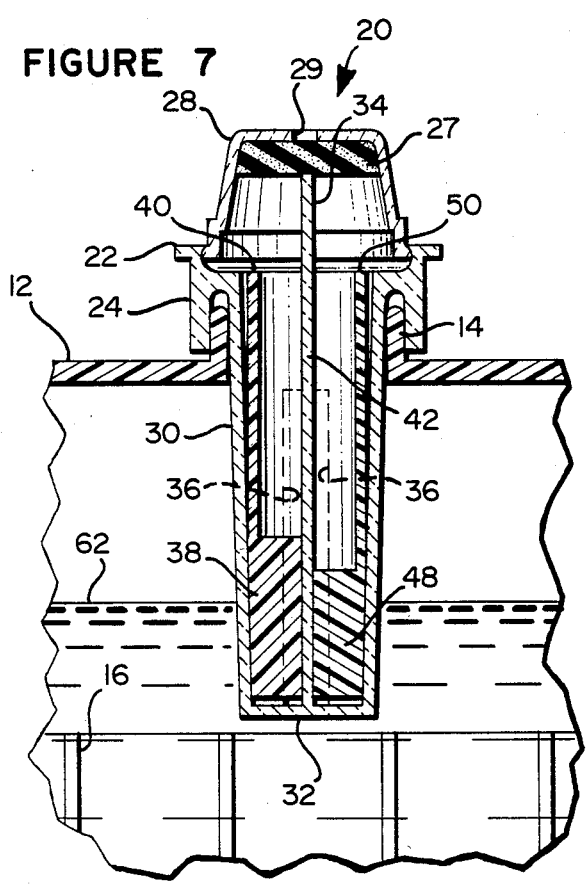
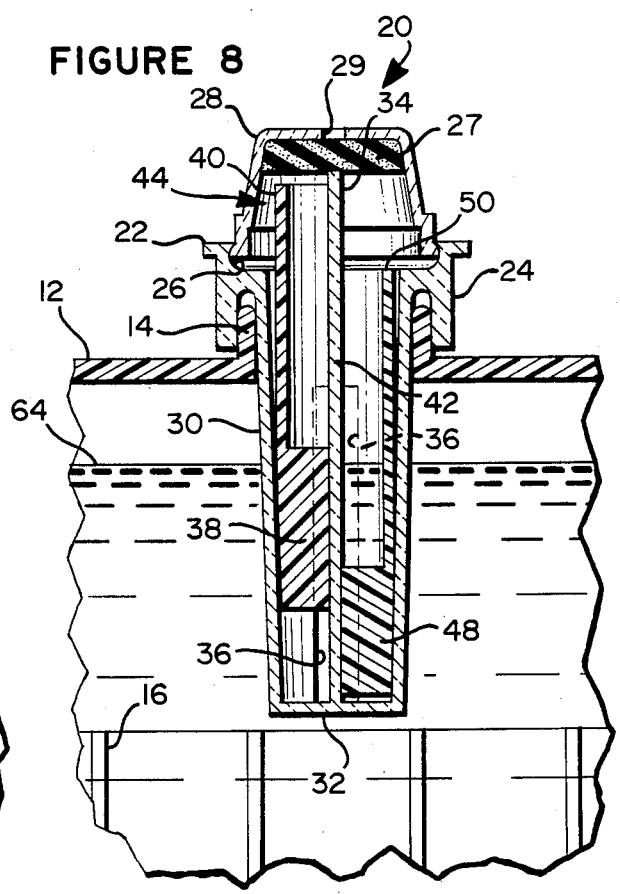

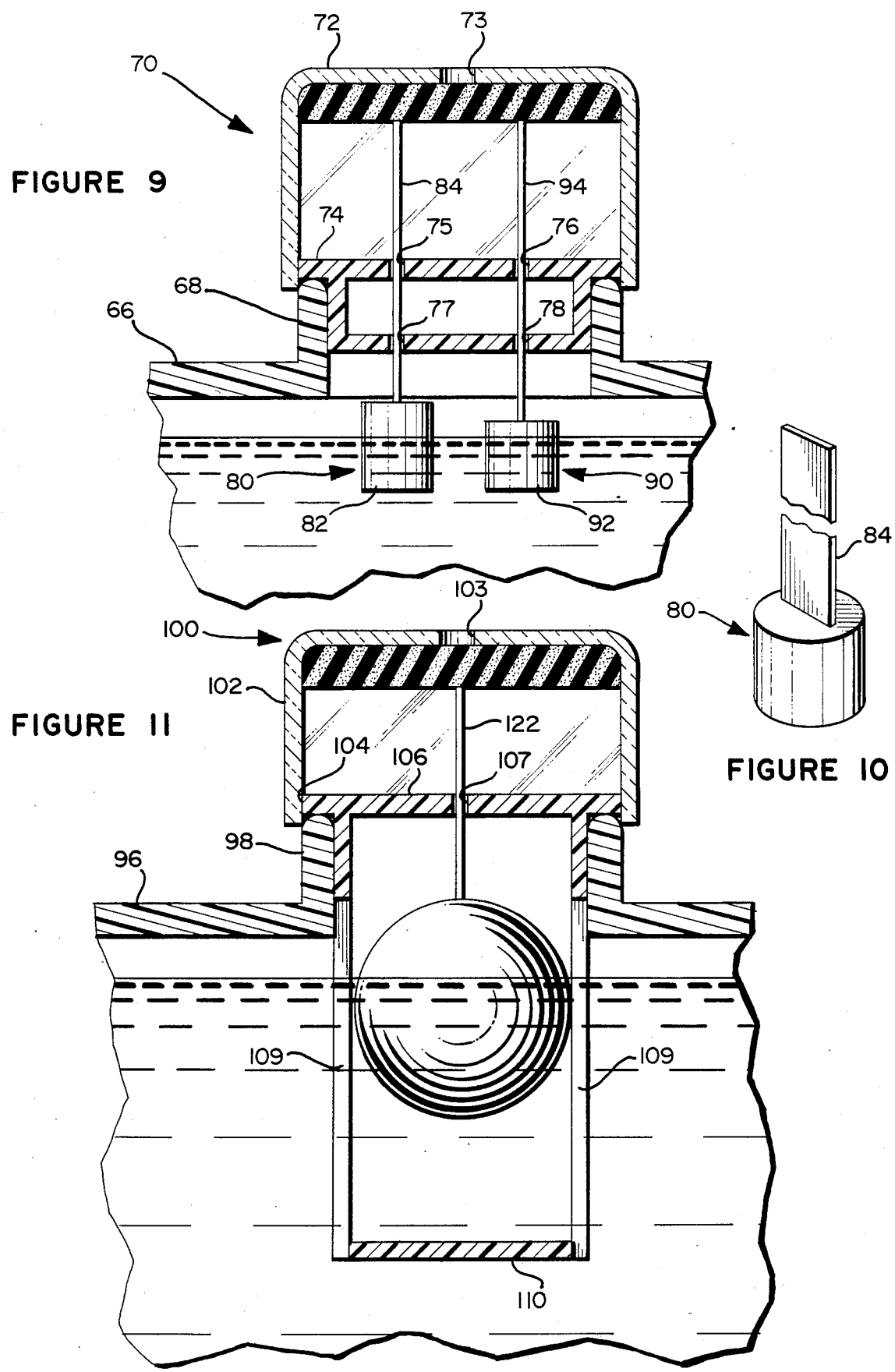

BATTERY CAP INDICATOR

BACKGROUND OF INVENTION

This invention relates to battery caps and particularly to those which permit the condition of the electrolyte within the given cell to be determined without removal of the cap.

Battery caps which permit viewing of some type of indicator in the battery cap have been well-known. Several of the designs which have been used are illustrated by the Sinclair patent, for example, U.S. Pat. No. 3,170,325, which has a cylindrical cap with a window.

Another type of construction is shown by the Gosheff U.S. Pat. No. 2,484,163 which discloses a transparent window for viewing the upper tip of a float.

Another battery cap with an indicator is disclosed in the Sakamoto U.S. Pat. No. 3,895,964. This design has a floating ball which indicates the level or specific gravity of the electrolyte in the storage battery.

A very common type of battery cap construction which has been used extensively is shown by the Melone U.S. Pat. No. 3,893,339.

The above patents all show devices of the general type in which a battery indicator cap has a float with some type of indicator. However, the battery cap designs mentioned above have one or more disadvantages which the subject invention overcomes.

SUMMARY OF INVENTION

Accordingly, it is a principal object of this invention to provide a battery cap which is an improvement over previously existing indicator-type battery cap devices.

Another object of this invention is to provide a battery cap which gives a dual simultaneous reading of both electrolyte level and density.

A still further object of this invention is to provide a battery cap indicator which is more easily read than the devices of the past.

A still further object of this invention is to provide a battery cap indicator in which the indicator elements give the observer an indication of electrolyte level and density over a desired range.

A still further object of this invention is to provide a battery cap indicator in which the observer can readily see what the values are with respect to the higher and lower extremes of the range of acceptable values.

Another object of this invention is to provide battery cap indicators with improved more freely-movable and relatively friction-free movement.

A still further object of this invention is to provide an improved battery cap indicator in which the well and guide construction or the indicator floats have greater capability for better float guidance and movement.

A still further object of this invention is to provide a battery indicator well for accommodating the floats in which the electrolyte is freely accessible to the interior and will readily permit flow therethrough while at the same time restricting electrolyte surges due to movement which would move the electrolyte up into the top portion of the battery cap.

Another object of this invention is to provide a more economical and simple battery cap indicator construction.

A further object of this invention is to provide a self-contained simple type of assembly which is readily molded and assembled.

These and further features of this invention will become apparent from the following description of the drawings.

DESCRIPTION OF THE DRAWINGS

FIG. 6 is a cross-sectional view of a battery cap indicator on the battery and showing both the electrolyte level and density indicators to be in satisfactory position with both indicators showing.

FIG. 7 is a cross-sectional view of the battery cap indicator in position on the battery showing a low electrolyte level with both floats in their lowermost positions.

FIG. 8 is a similar section of the battery indicator as shown in FIGS. 6 and 7 showing a low electrolyte density reading.

FIG. 9 is a sectional view of another type of battery indicator assembly.

FIG. 10 is a perspective view of the floats of FIG. 9.

FIG. 11 is a cross-sectional view of another type of battery cap indicator.

DESCRIPTION OF THE INVENTION

Figure 1:
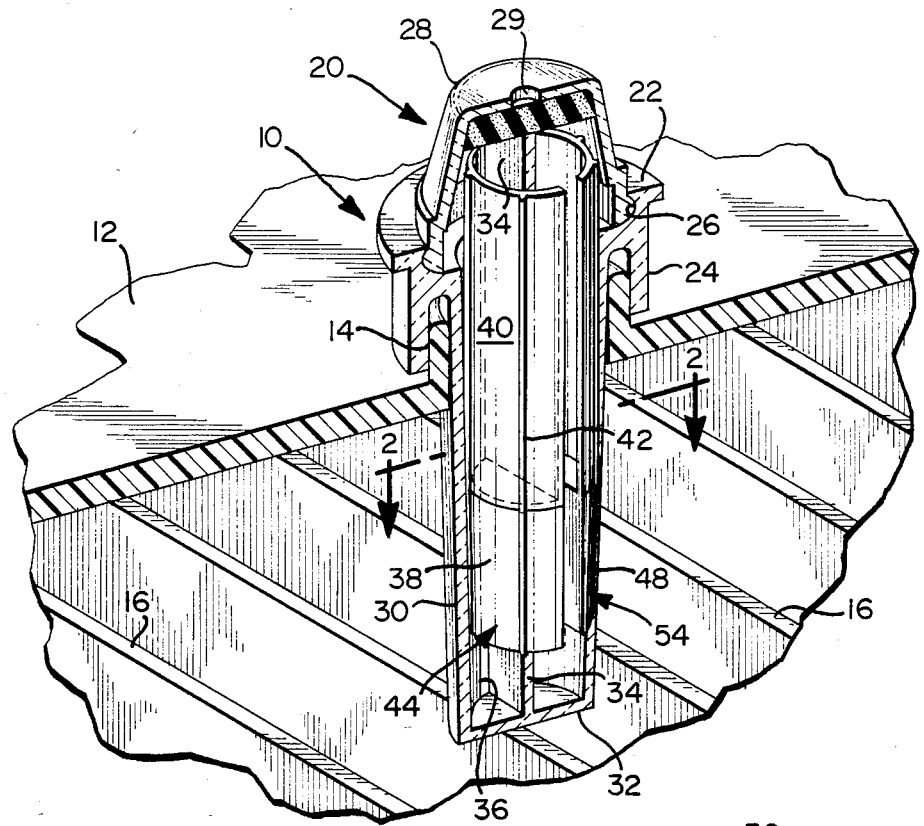
FIG. 1 is a perspective view of the battery cap indicator installed on a battery and shown in half section.

Referring to the drawings, a perspective half section of the battery cap assembly in position on the battery is shown in FIG. 1, and cross sections of this assembly are shown in FIGS. 6 through 8. The battery cap assembly generally indicated at 10 is mounted on the battery case top plate 12 and engages the circular upstanding flange 14 of each cell. The battery plates 16 are shown below the battery cap assembly 10 which has its lower section immersed in the electrolyte fluid. The fluid level is approximately one-half inch below the surface of the battery casing top plate 12.

The battery cap assembly 10 has an upper battery terminal top generally indicated at 20 which has an outwardly extending circular upper flange 22. It has a depending skirt 24 extending downwardly therefrom which extends over and engages the outer surface of the upstanding circular flange 14 of the battery case to hold the cap assembly in position. The inner circular section 26 lies between the circular outwardly extending flange 22 and the depending circular skirt 24, and receives the transparent removable top 20. An interior resilient sponge filter 27 is located at the top inner surface of the top and covers the central vent hole 29.

The other main subassembly is a lower depending generally cylindrical well 30. The well 30 has a bottom piece 32 and a central longitudinally extending flat divider 34. Electrolyte entry slit openings 36 through the well extend from the bottom plate 32 of the well 30 upwardly to the lower surface of the top plate 12 of the battery to permit the electrolyte to move into and out of the well freely and yet to provide a restriction which controls excessive flow into the well.

Figure 2:
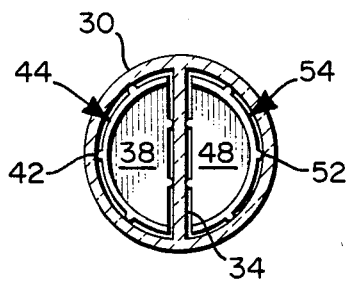
FIG. 2 is a perspective view along line 2—2 of FIG. 1.

The center and longitudinally-extending divider 34 provides two semi-circular float containing sections as can be seen in FIG. 2. The electrolyte level float generally indicated at 40 has a lower float section 38 which is a solid semi-cylindrical section having longitudinal ribs 42 for engagement with the inside surfaces of the well. The ribs provide a low frictional area guide or runner to provide greater ease of movement of the float. An upper curved indicator section 44 is mounted on the float section and extends upwardly into the inside of the terminal cap-receiving top 28. The cap 28 is made of clear plastic so that the height of the indicator can be seen from the outside. The length of the indicator is chosen so that it will extend above lip 22 and inside of the top when the electrolyte level is within acceptable limits.

Figure 5:
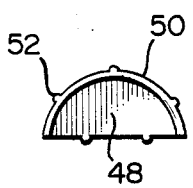
FIG. 5 is a cross section along line 5—5 of FIG. 4.

The electrolyte density or hydrometer float generally indicated at 50 has a float section 48 which is semicircular in cross section as indicated in FIG. 5. The general outline and shape of this float is the same as that of the electrolyte level float 40. It has ribs 52 equivalent to the ribs 42 of the electrolyte float which extend upwardly along its periphery. The indicator section 54 is curved and is a continuous extension of the circular surface of the float section and extends upwardly into the indicator cap 28. The length is chosen so that its top will be above the flange 22 of the battery cap assembly when the electrolyte density is at the bottom of the acceptable range. It will sink below this height as the electrolyte density becomes lower, and will rise to the top at the high valve for the range. The ribs 52 extend upwardly along the surface of the indicator to provide less frictional engagement with the inside of the well surface. This construction is the same as that shown for the float 40 in the perspective view of FIG. 1. The material and weight of this float is selected for a density range of 0.81 to 0.95.

FIG. 8 shows a half-sectional view of the battery cap assembly 20 in position. Note the fit of the flange 24 of the cap assembly down and over the upwardly extending circular flange 14 of the battery cell. It also should be noted that the downwardly depending well section 30 extends downwardly so that its bottom 32 just slightly clears the top of the battery plates 16.

In FIG. 6, the condition of the electrolyte is shown with an acceptable electrolyte level and also an acceptable electrolyte density reading within the range. The tops of the indicators 44 and 54 are in a position above the circular lip 22 and can readily be seen through the transparent battery cap top 28.

In FIG. 7, the electrolyte level 62 is low, and the electrolyte solution reading is a low one. Both floats 40 and 50 descend to the bottom of their respective semicircular well areas and rest on the bottom 32. Since the readings are below acceptable range, the top of the indicators are below the circular flange 22 and cannot be seen through the transparent top 28.

In FIG. 8, the level of the electrolyte is at 64 and is acceptable and the indicator 40 shows above the flange 22, while the top of the indicator 54 is below the circular lip 22, indicating low electrolyte density.

With regard to the movement of the floats, it should be noted that they more readily slide up and down within the well, which is slightly tapered to eliminate binding. Note further that the ribs carried by the floats, as shown in FIG. 2, also act to eliminate binding.

FIG. 9 shows another type of battery cap indicator in which the battery top 66 has a flange 68 similar to the construction of the battery shown in the earlier figures. In this unit, generally indicated at 70, a large battery cap top 72 having a vent hole 73 has a simple circular configuration in which the lower end of the side wall fits over the flange 68. A closed circular housing 74 having a rectangular cross section fits within the circular flange 68 with its top having a lip which projects over the top of the flange 68. The housing has rectangular-shaped indicator-receiving slits 75 and 76 and vertically aligned slits 77 and 78 through the bottom surface of the housing.

The electrolyte level float generally indicated at 80 has a solid floatation cylinder 82 and an integral vertically extending indicator element 84.

The electrolyte density indicator float generally indicated at 90 has a solid cylindrical float element 92 and an integral vertical upstanding indicator element 94 of thin, substantially rectangular configuration. Both of the indicators have a length selected so that the indicators will be up at the top and in clear view to the observer when the condition of the electrolyte both in density (hydrometer) and level within the normal range.

FIG. 10 is a perspective view of float 80. It will be noted that the end cross section indicator 84 is connected to the top of the surface.

FIG. 11 discloses another modification of a battery type terminal cap in which construction similar to that of FIG. 9 for the upper section is disclosed and a single well configuration, generally indicated at 100, constitutes the bottom portion of the assembly.

The transparent lower open end top 102 has a vent opening 103 with a filter absorbent member similar to that of FIGS. 1 and 9. The top is circular and is disposed over the circular upstanding flange 98 of the battery casing top cell wall 96, such that its lower depending skirt fits thereover in tight engagement. The well-piece has a circular top upstanding piece 104 with a lip which sits firmly within and over the top edge of the upstanding flange 98. It has a top section 106 sealing the battery interior cap area from the interior of the battery case. An opening 107 of thin rectangular cross section is centrally located to accommodate the float indicator. The depending well section is cylindrical in shape and has four thin slits 109 to permit the electrolyte to pass into the interior of the well. The bottom 110 of the well is sealed and is positioned as with the assembly of FIG. 1 slightly above but close to the plates of the battery.

In this instance, the float is a spherical solid member 120 with a thin rectangular section upstanding indicator piece 122.

OPERATION

Referring to FIGS. 1 to 8, the floats with their indicator will vary in height depending upon the density of the electrolyte and the level thereof. FIGS. 1 and 6 show the battery cap with both indicators in the optimum position when both density and liquid level are at a maximum. When the indicators fall, either the density of the electrolyte or the level is below optimum. The height of the window to the battery cap lip 22 gives the range for the battery electrolyte change in level or density. The height of the cap is selected so that the indicators will only appear when they are within the acceptable level range. The height of the cap can be figured at slightly more than half an inch.

Figure 3:
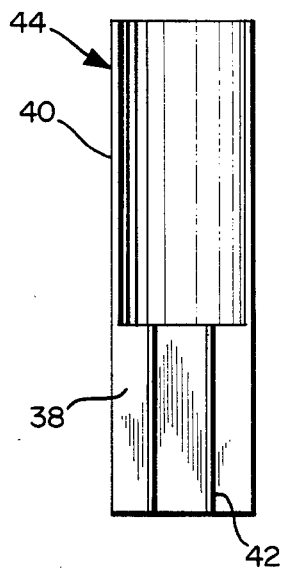
FIG. 3 is a side view of the electrolyte level float.
Figure 4:
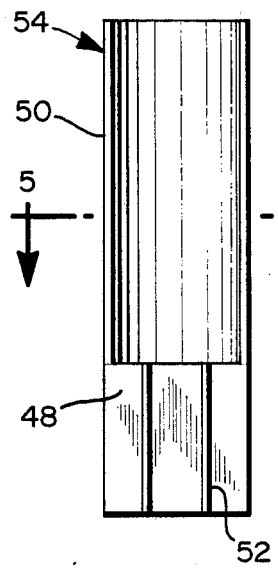
FIG. 4 is a side view of the electrolyte density measuring float.

The floats of FIGS. 3 and 4 respectively are for electrolyte density and electrolyte level. The float is constructed in such a way that its density is approximately 0.913 so that it will sink if the density of the electrolyte falls below 1.240.

With respect to the type material for the electrolyte float, polypropylene or similar type of plastic with a density of 0.921 or 0.91 may be selected. Any kind of material lighter than the electrolyte can be used.

For balance, a ball of lead may be used at the bottom of the floats to provide better balance and weight so that the float will ride with the indicator in an upright position.

The ratio of vertical piece volume, that is the indicator with respect to the float, is on the order of a ratio of 1 to 9 with a total value of 1.250.

With respect to the construction of the well, it should be noted that the well is tapered inwardly from top toward the bottom slightly. This construction permits more easy movement of the float and eliminates the possibility of the float sticking due to frictional engagement or cocking action.

It should also be noted that each of the floats has ribs along the outer periphery thereof which also extend to the indicators, if the indicators are to be constructed in line with the outer periphery of the float. These ribs are for engagement with the surface of the well, such that they act as runners and reduce the friction-engaging surfaces. These ribs provide a very important aspect in this regard, since it is essential that the floats move freely.

The slots in the wells are designed to provide a narrow passage for the electrolyte so that the level can actually be inspected while at the same time the narrow passage restricts flow such that there will note be overflow into the cap top.

With respect to the indicators, they are preferably made of different colored material, such as red and blue, to distinguish the electrolyte level indicator from the electrolyte density indicator.

It can be seen that with the provision of the simple construction heretofore described, it is possible to get both a hydrometer reading and a liquid level reading simultaneously which is continually observable. Removal of the cap for determination of level is unnecessary. Similarly, the need to use hydrometer reading instruments after removal of the cap to determine hydrometer reading is also unnecessary.

Accordingly, it can be seen that in one simple structural embodiment of a battery cap assembly, a dual indicator function is accomplished.

It is also apparent that with the construction of the well depth, its taper, and the rib construction of the floats, there is provided a relatively free-moving float for the well construction which eliminates the problem of float sticking.

The unit is of simple construction so that it can be injection molded on a mass-produced basis, thereby providing for a nominally priced assembly.

The dual function of two indicators is made possible by the central longitudinal piece 44 in the well, which provides for two semi-circular elevted cross-sectional float passages for the easy vertical movement of the floats within the simple dual section well construction of the assembly.

A simple dual float battery cap terminal with a transparent indicator cap is shown in FIG. 9. This assembly dispenses with the use of a well and relies upon the vertically-spaced slots of the cap body to maintain the indicators in vertical aligned position.

In FIG. 11, a battery cap assembly with a depending well is shown in which the central slot retaining configuration of 1 or 7 has sufficient clearance to allow slight play of the indicator and because of the clearance between the indicator 122 and the periphery of the rectangular slot. In this instance, the circular float 120 has clearance between the side walls of the indicator and does allow for some lateral movement. This configuration uses the deep well construction of FIGS. 1 to 8 with the thin vertical electrolyte passage slots.

While this invention has been described, it will be understood that it is capable of further modification, uses and/or adaptations of the invention following in general the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. A battery cap indicator for a battery cell, comprising:
   (a) a cap having a circular flange for firmly engaging a periphery adjacent an opening in a battery casing and including a top section which projects upwardly and over the flange,
   (b) the top section having an interior which is observable through a transparent portion thereof,
   (c) an elongated cylindrical depending well open at its top and closed at the bottom thereof which is connected to the circular flange and is of sufficient length to extend downwardly beneath the battery casing to an electrolyte in close proximity to a plurality of battery plates within the battery casing,
   (d) a longitudinally extending divider within the well for separating the interior thereof into two separate longitudinal semi-cylindrical channels,
   (e) the well having a wall with port means for permitting movement of electrolyte into and out of the well to accurately reflect level of the electrolyte within the battery casing,
   (f) first float means responsive to electrolyte density disposed within one of the channels, said first float means having a density which closely matches the density of the electrolyte and includes a closed semi-cylindrical float lower section and an upwardly extending curved projection forming a readily identifiable indicator upper portion which extends upwardly into the top section of the cap,
   (g) second float means disposed within the other longitudinal channel and responsive to movement of the electrolyte level, said second float means having a lower semi-cylindrical float and curved projection forming a readily identifiable upper indicator portion which extends upwardly and into the top section of the cap,
   (h) the length of the first and second float means with their respective indicator portions being approximately equal to the length of the well such that upward movement of the float means will move the indicator levels upwardly into the interior of the top section of the cap for observation,
   (i) the elongated cylindrical depending well having a slight downward taper such that the lower most end thereof is slightly smaller than that of the upper end of the well,
   (j) each float means having elongated longitudinally extending ribs which are disposed on an outer surface of said float means for engaging the inner surfaces of the longitudinal channels along substantially the entire length of said channels, and (k) the indicator portions of said float means being separately identifiable such that the single battery cap indicator gives a readily observable and sensitive reading for both electrolyte density and level for the cell.

2. The battery cap indicator as set forth in claim 1, wherein:
(a) the first float has a density within the range of 0.81 to 0.95.

3. The battery cap indicator as set forth in claim 1, wherein:
(a) the port means of the well is a series of narrow vertical slots extending the length of the wall of the well.

4. The battery cap indicator as set forth in claim 1, wherein:
(a) each float means consists of a solid lower float portion having a cross section slightly less than in size and matching in shape the cross-section of the longitudinal channel within which it is disposed.

* * * * *